United States Patent
See et al.

(10) Patent No.: US 11,343,366 B2
(45) Date of Patent: May 24, 2022

(54) MICROPHONE CONTROL

(71) Applicant: Hewlett-Packard Development Company, L.P., Spring, TX (US)

(72) Inventors: Lee Lim See, Taipei (TW); Szu-Yi Chai, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/042,150

(22) PCT Filed: Sep. 27, 2018

(86) PCT No.: PCT/US2018/053153
§ 371 (c)(1),
(2) Date: Sep. 27, 2020

(87) PCT Pub. No.: WO2020/068087
PCT Pub. Date: Apr. 2, 2020

(65) Prior Publication Data
US 2021/0211532 A1  Jul. 8, 2021

(51) Int. Cl.
*H04M 1/05* (2006.01)
*H04R 1/10* (2006.01)

(52) U.S. Cl.
CPC .......... *H04M 1/05* (2013.01); *H04R 1/1008* (2013.01); *H04R 1/1066* (2013.01)

(58) Field of Classification Search
CPC ...... H04R 1/1008; H04R 1/1066; H04R 1/10; H04M 1/05; G06F 3/16
See application file for complete search history.

(56) References Cited

U.S. PATENT DOCUMENTS

| | | | |
|---|---|---|---|
| 6,006,115 A | 12/1999 | Wingate | |
| 8,135,157 B2 | 3/2012 | Tarvonen et al. | |
| 9,813,799 B2 | 11/2017 | Gecawicz et al. | |
| 2006/0140435 A1 | 6/2006 | Sheehy et al. | |
| 2008/0318639 A1* | 12/2008 | Crestol | H04M 1/6066 455/569.1 |
| 2009/0080683 A1 | 3/2009 | Bevirt et al. | |
| 2010/0040252 A1 | 2/2010 | Thompson et al. | |
| 2013/0115882 A1* | 5/2013 | Crestol | H04W 4/10 455/41.2 |
| 2014/0233754 A1 | 8/2014 | Chae et al. | |
| 2016/0062489 A1* | 3/2016 | Li | A63F 13/21 345/163 |

FOREIGN PATENT DOCUMENTS

| | | |
|---|---|---|
| CN | 104023290 B | 8/2017 |
| EP | 1530348 A1 | 5/2005 |
| EP | 2296385 A1 | 3/2011 |
| KR | 20040077170 A | 9/2004 |

* cited by examiner

*Primary Examiner* — Tuan D Nguyen
(74) *Attorney, Agent, or Firm* — HP Inc. Patent Department (57) ABSTRACT

The present subject matter relates to techniques of controlling a position of a microphone coupled to a headset. In an example implementation of present subject matter, the position of the microphone coupled to the headset is changed between a first position and a second position, depending upon a signal received by the headset.

15 Claims, 6 Drawing Sheets

MICROPHONE CONTROL

BACKGROUND

Headsets, in general, are used as input/output devices for various multimedia purposes, such as listening to music, playing games, attending meetings over the internet, and the like. Many headsets are coupled to a microphone to allow a user to provide voice signals. In order to provide flexibility to a user while inputting voice signals, the headsets also allow the user to change the position of a microphone from one position to another.

BRIEF DESCRIPTION OF FIGURES

The following detailed description references the drawings, wherein.

DETAILED DESCRIPTION

Headsets, in general, are coupled to microphones that allows a user to input voice signals. A microphone coupled to a headset facilitates the user to provide voice signals while receiving audio signals from the headset. In order to provide flexibility to the user to handle the microphone, some headsets allow the user to adjust position of the microphone from one position to another. Such flexibility may allow the user to pull the microphone near their mouth and push the microphone away from their mouth depending upon an intended use. For instance, the user may manually pull the microphone near his mouth, while inputting voice signals and may push it away while the microphone is not in use.

A change in the position of the microphone may further allow interferences, such as external noises, to be reduced while the user is providing voice signals. For instance, while providing voice signals to the microphone, the microphone may be pulled near the mouth of the user so that the user's voice signals are captured more efficiently than when the microphone is away from the mouth of the user. Similarly, the microphone may be pushed away from the user's mouth so that no voice signals of the user are captured by the microphone. Thus, the movement of microphone between multiple positions may allow effective use of the microphone in headsets.

However, in many instances, the user forgets to change the position of the microphone during or after use. For example, a user may forget to pull the microphone near her/his mouth while speaking. This may lead to either improper or no capture of the voice signals. Similarly, the user may forget to push the microphone away from her/his mouth when (s)he is done speaking. This may lead to undesirable capturing of the users voice signals which are unintended by the user to be captured. Thus, occurrence of such situations leads to either no capturing, or improper capturing of voice inputs of the user, by the microphone. Further, manually changing the position of the microphone interrupts the user work and diverts her/his attention, thus degrading the overall user experience.

According to example implementation of present subject matter, techniques of controlling a position of a microphone coupled to a headset are described. In an example, the position of the microphone coupled to the headset is changed between a first position and a second position, depending upon a signal received by the headset. The change in position of the microphone based on received signals may allow the user to effectively utilize the microphones coupled to headsets and as per intended use.

In operation, a first signal may be received by the headset. The first signal may either be received from a computing device coupled to the headset, or from any user input interface coupled with the headset. Further, in response to the first signal, the position of the microphone attached to the headset may be changed from a first position to a second position.

In an example of the present subject matter, a second signal may further be received by the headset. In response to the second signal, the position of the microphone may be changed from the second position to a first position.

In an example implementation of present subject matter, the first signal and the second signal may indicate an operation status of the microphone. For instance, the first and the second signal may indicate a mute, or an unmute operational status of the microphone. Accordingly, in an example, when the first signal is indicative of the unmute operational status of the microphone, the position of the microphone may change from a retracted position to an extended position. Further, in another example, when the second signal is indicative of the mute operational status of the microphone, the position of the microphone may change from the extended position to the retracted position.

Thus, based on first and second signals received by the headset, the position of the microphone may be controlled. This may allow effective use of the microphone based on the intended use by the user.

The above techniques are further described with reference to FIG. 1 to FIG. 6. It would be noted that the description and the Figures merely illustrate the principles of the present subject matter along with examples described herein and would not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

Figure 1:
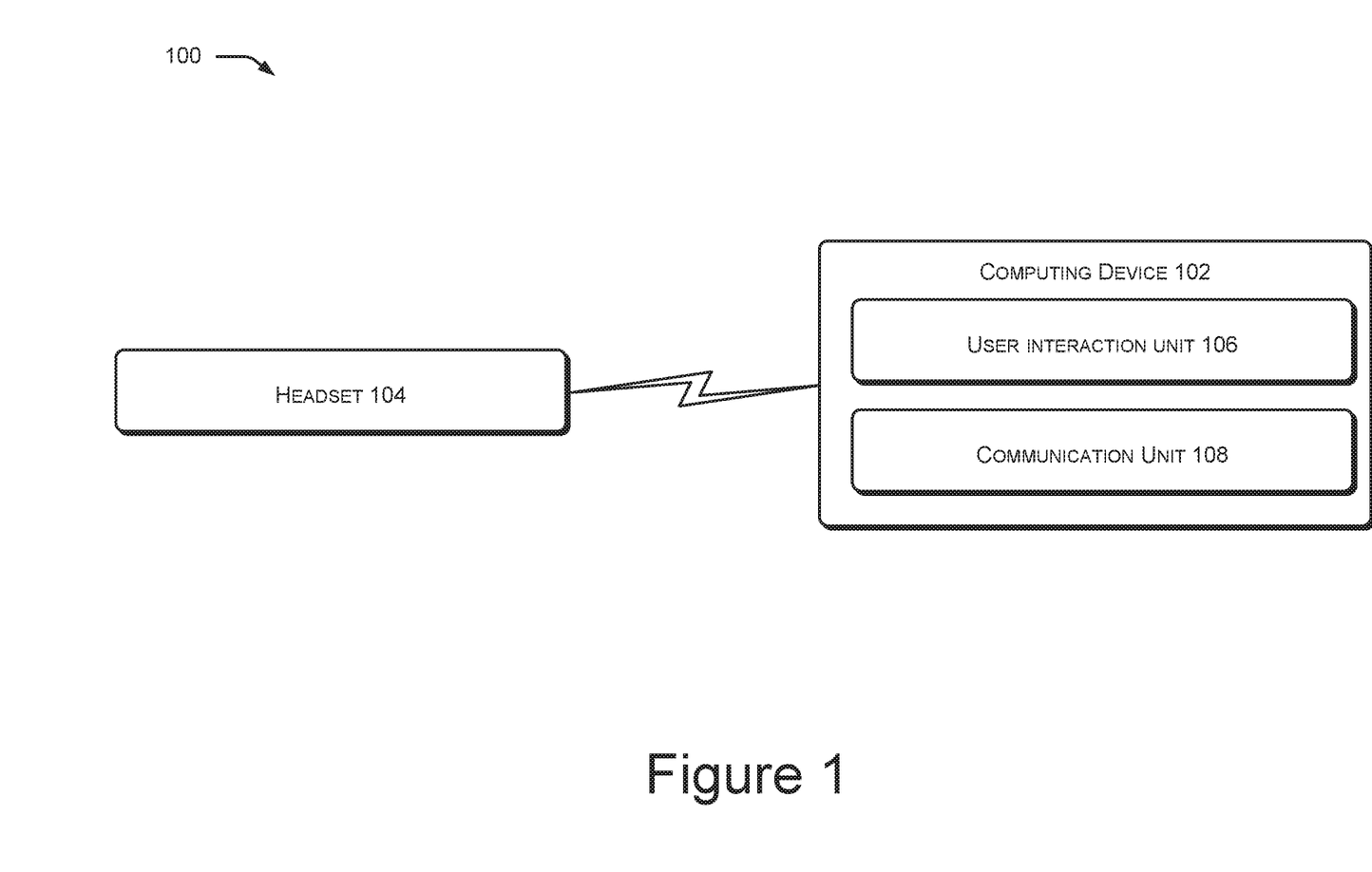
FIG. 1 illustrates a computing environment, in accordance with an example implementation of the present subject matter.

FIG. 1 illustrates a communication environment 100, in accordance with an example implementation of the present subject matter. The communication environment 100 may comprise a computing device 102 and a headset 104 coupled to the computing device 102. The headset 104 may be coupled to the computing device 102 to send and receive analog and/or digital signals. The headset 104 may be coupled to the computing device 102 by any known mode of coupling that may include, but not limited to, electrical coupling, mechanical coupling, wired coupling and wireless coupling.

Examples of the computing device 102 may include devices, such as laptops, desktops, smartphones, and tables that incorporates auxiliary ports and multiple wireless interfaces to connect to headsets. Further, examples of headset 104 may include devices that may be used to input/output voice signals. In an example, the headset 104 may include either a wired headset or a wireless headset. Further, the headset 104 may be coupled to a microphone (not shown). The microphone may be used by a user to provide voice signals.

In an example of the present subject matter, the computing device 102 may include a user interaction unit 106 and a communication unit 108. The user interaction unit may facilitate interactions with the user through different interfaces, such as a graphical user interface. The communication unit 108 may facilitate communication between the computing device 102 and other devices, such as the headset 104.

In an example implementation of present subject matter, the user interaction unit 106 may receive an input from a user to change the operational status of the microphone. For example, the user may provide an input to the user interaction unit 106 to change the operational status of the microphone from mute to unmute, or from unmute to mute. Upon receiving the input from the user, the communication unit 108 may send a first signal to the headset 104 to change the position of the microphone from a first position to a second position. In an example, the position of the microphone may be changed from a retracted position to an extended position, and vice versa. In another example, the position of the microphone may be changed by an actuator (not shown). Examples of actuator may include, but not limited to, comb drive actuator, electric motor actuator, relay-based actuators, and piezoelectric actuator. Further details of controlling the position of the microphone are included in the forthcoming figures.

Figure 2:
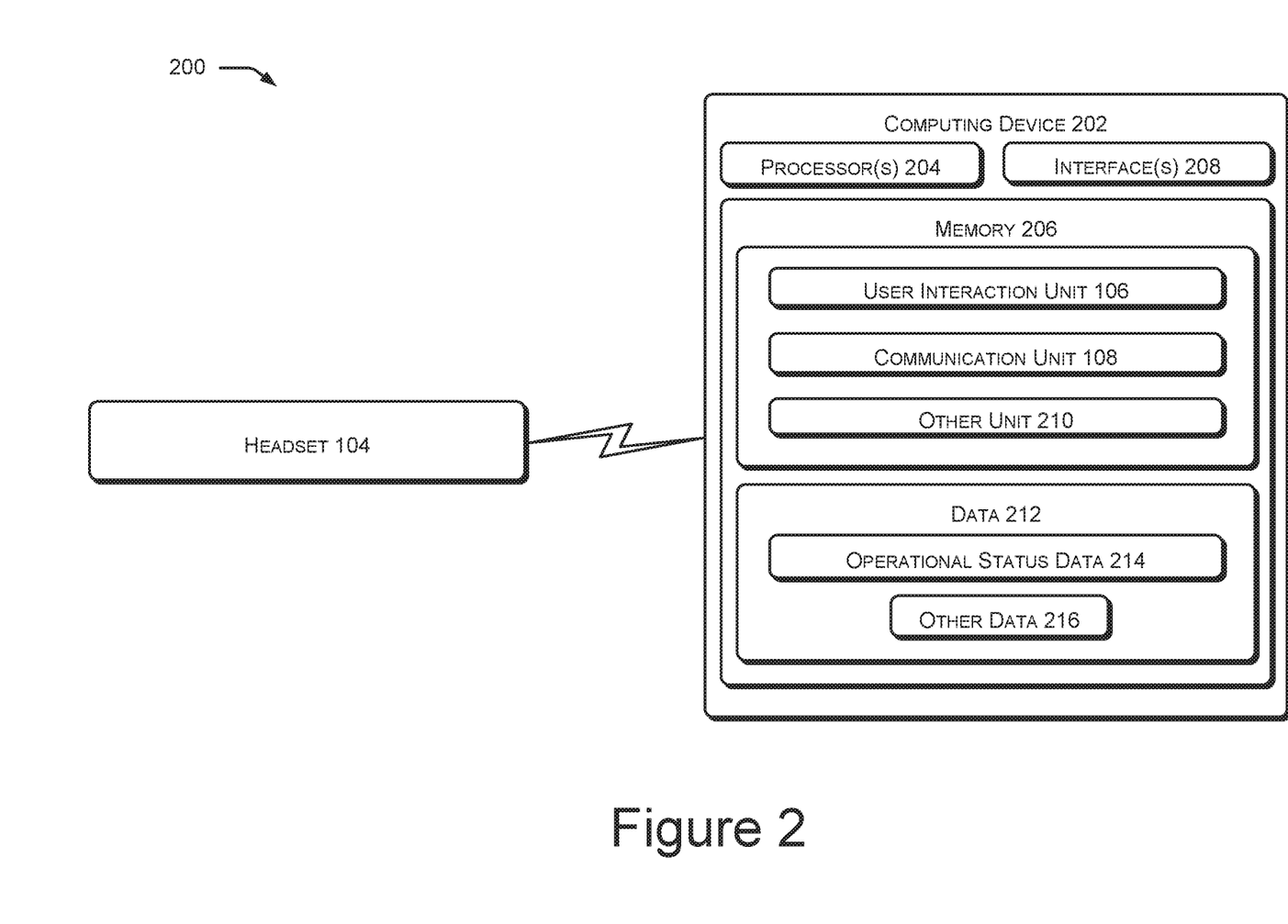
FIG. 2 illustrates a communication environment, in accordance with another example implementation of the present subject matter.

FIG. 2 illustrates another communication environment 200, in accordance with an example implementation of the present subject matter. In an example, the communication environment 200 includes a computing device 202 coupled to a headset 104. As described earlier, the headset 104 may be coupled to the computing device 202 by any known mode of coupling that may include, but not limited to, electrical coupling, mechanical coupling, wired coupling and wireless coupling.

The computing device 202 may further include processor(s) 204, a memory 206, and interface(s) 208 coupled to the processor(s) 204. The functions of the various elements shown in the Figures, including any functional blocks labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, conventional and/or custom, may also be included.

Further, the memory 206 may include any computer-readable medium including, for example, volatile memory (e.g., RAM), and/or non-volatile memory (e.g., EPROM, flash memory, etc.). The interface(s) 208 may include a variety of programmed or hardware interfaces that enable the computing device to communicate with image capturing device and touch surface.

The computing device 202 may further include the user interaction unit 106 along with the communication unit 108, other units 210, and data 212. In an example, the user interaction unit 106, the communication unit 108, and the other units 210 may reside in the memory 206. In another example, the user interaction unit 106, the communication unit 108, and the other units 210 may be implemented as separate hardware capable of performing different functionalities of the computing device 202. The user interaction unit 106, the communication unit 108, and the other units 210 may include routines, programs, objects, components, data structures, and the like, which perform particular tasks or implement particular abstract data types. The user interaction unit 106, the communication unit 108, and the other units 210 may further include electronic circuitry or a combination of electronic circuitry and control programs that operate the components according to the functions described herein. In an example, the other units 210 may perform functionalities that supplement other functions of the computing device 202.

The data 212 serves, amongst other things, as a repository for storing data that may be fetched, processed, received, or generated by the user interaction unit 106, the communication unit 108, and the other units 210. In an example, the data may include operational status data 214. The data 212 may further include other data 216 to store data generated by other units of the computing device 202. In an example implementation of the present subject matter, the operational status data 214 may include input provided by a user related to the operational status of a microphone.

In an example implementation of present subject matter, the computing device 202 may receive an input from a user via the user interaction unit 106. The input from the user may indicate a change in operational status of the microphone.

In an example, in response to the input received by user the interaction unit 106 from the user, the communication unit 108 may send a first signal to the headset 104 to change the position of the microphone from a first position to a second position. In an example, when the input from the user is to change the operational status of the microphone from unmute to mute, the position of the microphone may be changed from an extended position to a retracted position. Similarly, when the input from the user is to change the operational status of the microphone from mute to unmute, the position of the microphone may be changed from the retracted position to the extended position.

In another example implementation of present subject matter, the computing device 202 may receive another input from the user via the user interaction unit 106. The input from the user may indicate a further change in operational status of the microphone. In response to the input received by the user interaction unit 106, the communication unit 108 may send a second signal to the headset 104 to change the position of the microphone from the second position to the first position.

Figure 3:
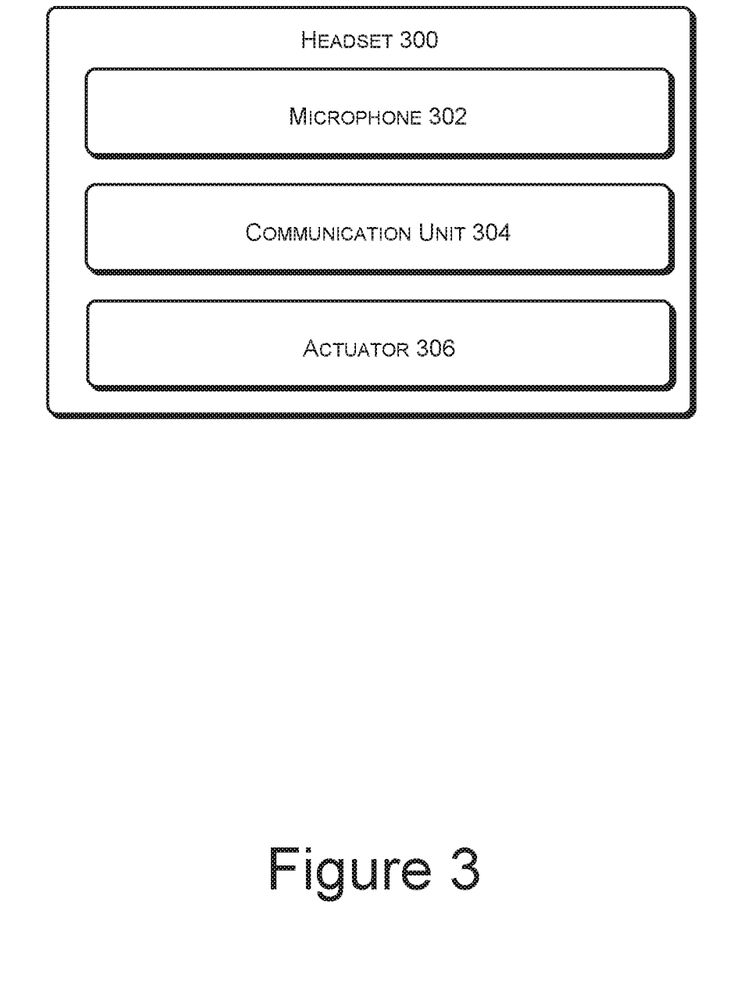
FIG. 3 illustrates a headset, in accordance with an example implementation of the present subject matter.

FIG. 3 illustrates a headset 300, in accordance with an example implementation of the present subject matter. In an example implementation of present subject matter, the headset 300 may include a microphone 302, a communication unit 304, and an actuator 306 coupled to the microphone 302. Examples of microphone 302 may include the devices that may be used to capture voice signals. Further, the actuator 306 may include, but not limited to, comb drive actuator, electric motor actuator, relay-based actuators, and piezoelectric actuator.

In an example, the headset 300 may receive a first signal from the computing device (not shown) via the communication unit 304. The first signal may indicate a change in operational status of the microphone 302. In an example, the first signal may indicate a change in operational status of the microphone 302 from mute to unmute or unmute to mute.

In an example, the position of the microphone 302 may be controlled by the actuator 306, such as a servo motor (not shown). The servo motor may include a first shaft and the microphone 302 may include a second shaft, such that the microphone 302 is coupled mechanically to the servo motor through a mechanical coupling of the first shaft and the second shaft. In an example of the present subject matter, the first shaft may include circular gears and the second shaft may include helical/circular grooves, such that the rotation of the first shaft moves the second shaft in different directions. In operation, the actuation of the servo motor may cause the first shaft to rotate, leading to the movement of the second shaft, which in turn, may change the position of the microphone 302 from the first position to the second position, and vice versa.

In another example, the microphone 302 may be coupled to the servo motor via a scissors lift. The scissor lift may have the servo motor connected on one end and the microphone 302 connected on another end. The scissors lift may utilize folding supports arranged in crisscross pattern, such that pressure applied on the folding supports may cause the folding supports to push a distal end of the scissors lift outwards. In operation, the servo motor may apply pressure on the folding supports on a proximal end of the scissor lift to cause movement of the distal end of the scissors lift, thereby changing the position of the microphone 302 between the first position and the second position.

In yet another example, the microphone 302 may be coupled to the actuator 306, such as a stepper motor (not shown), via a pulley and tension chords. The stepper motor may be coupled to a pulley which in turn may be coupled to the microphone 302 using tension chords. A rotation of the stepper motor may cause the pulley to rotate by a predefined angle, which may further change the position of the microphone 302 between the first position and the second position.

In another example implementation of present subject matter, the actuator 306, in response to the first signal, may change the position of the microphone from a first position to a second position. In an example, the actuator 306 may change the position of the microphone from a first position to a second position, if the first signal is indicative of a change in operational status of the microphone 302 from unmute to mute. Similarly, the actuator 306 may change the position of the microphone from the second position to the first position, if the first signal is indicative of a change in operational status of the microphone 302 from mute to unmute. In an example, the first position may be one of an extended position and retracted position. Further, in an example, the first position may be closer to the mouth of a user and second position may be away from the mouth of the user.

Figure 4:
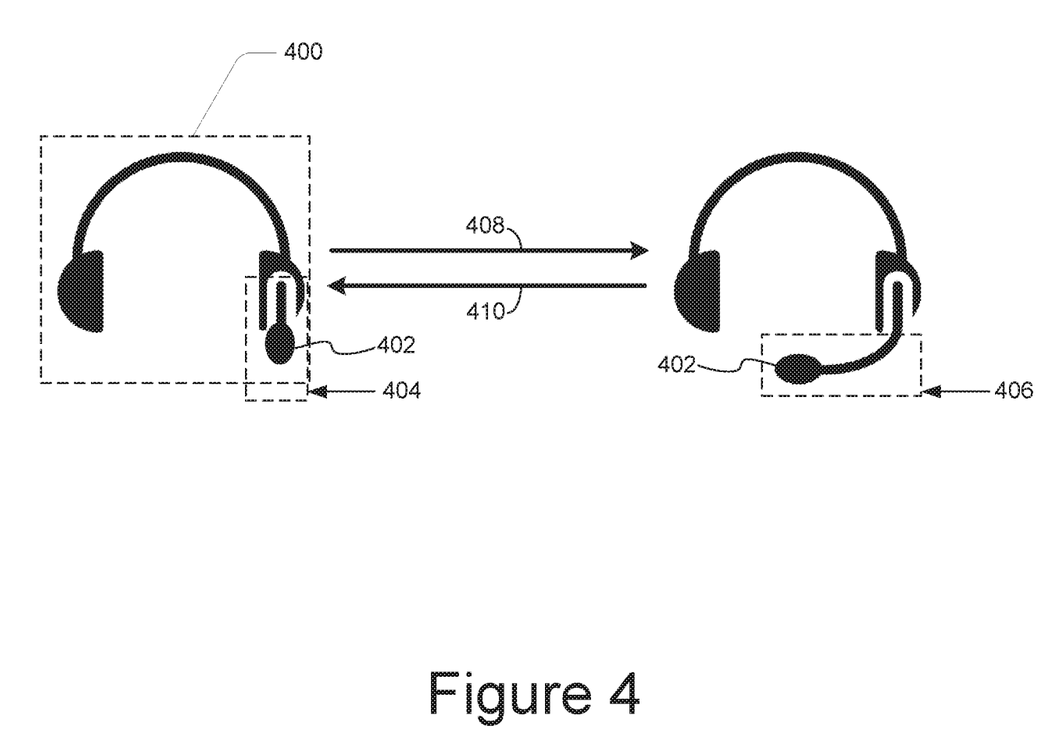
FIG. 4 illustrates a headset with different positions of a microphone, in accordance with an example implementation of the present subject matter.

FIG. 4 illustrates a headset 400 with various positions of a microphone 402, in accordance with an example implementation of present subject matter. In an example, the headset 400 may have the microphone 402 integrated with body of the headset 400. Further, the microphone 402 is flexible and may move between a first position 404 and a second position 406. In another example, the microphone 402 may be movable and may move between multiple positions between the first position 404 and the second position 406.

In an example implementation of present subject matter, the microphone 402 of the headset 400 may be in the first position 404 and the first position 404 may be a retracted position. Further, as a first signal 408 indicating the change in operational status of the microphone is received by the headset 400, the position of the microphone may change from the first position 404 to a second position 406. The first signal 408 may be received from a computing device 202, or from an interface communicatively coupled to the headset 400. For example, a user may provide the first signal 408 through a smartphone coupled to the headset 400 through Bluetooth. In another example, the user may provide the first signal 408 through an interface provided on the headset 400, such as a push button.

In an example, the first signal 408 may indicate change of the operational status of the microphone 402 from a mute to an unmute status. In such a situation, the microphone 402 may be moved by the actuator 306 from the first position 404 to the second position 406.

In another example implementation of present subject matter, the microphone 402 of the headset 400 may be in the second position 406 where the second position 406 may be an extended position. The headset 400 may receive a second signal 410 indicating a further change in the operational status of microphone 402. In such a situation, the position of the microphone 402 may change from the second position 406 to the first position 404.

Figure 5:
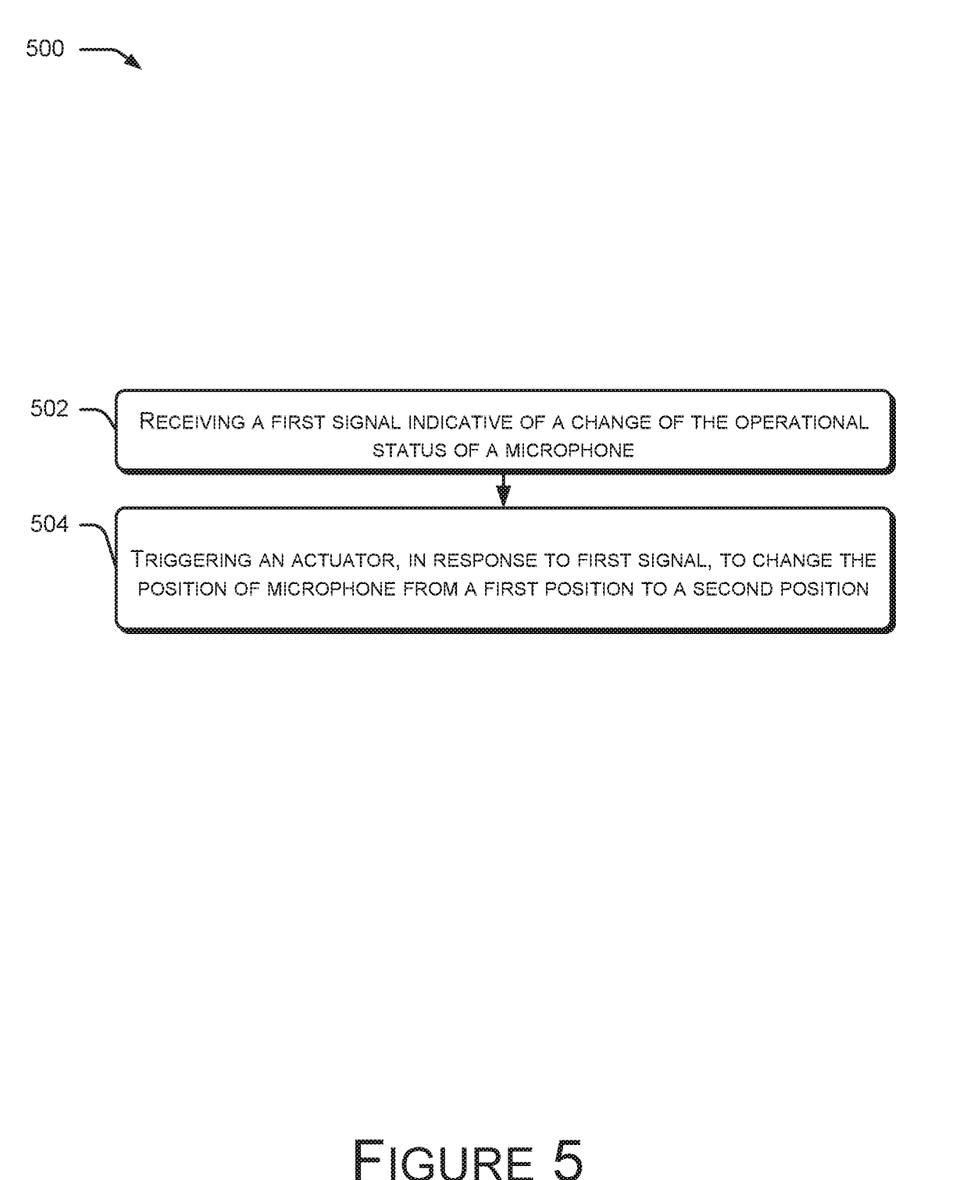
FIG. 5 illustrates a method of changing a position of a microphone of a headset, in accordance with an example implementation of the present subject matter.

FIG. 5 illustrates a method 500 of changing the position of a microphone of a headset, in accordance with an example implementation of the present subject matter. Although the method 500 may be implemented in a variety of computing system, but for the ease of explanation, the description of the exemplary method 500 is provided in reference to the above-described communication environment 100. The order in which the method 500 is described is not intended to be construed as a limitation, and any number of the described method blocks may be combined in any order to implement the method 500, or an alternative method.

It may be understood that blocks of the method 500 may be performed in the communication environment 100. The blocks of the method 500 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

At block 502, a first signal indicating a change in operational status of a microphone is received. In an example, the first signal may be sent by a computing device, such as the computing device 102 and received by a headset, such as the headset 104, and the headset 104 may be coupled to the microphone.

At block 504, an actuator is triggered, in response to the first signal, to change the position of the microphone from a first position to a second position. In an example, an actuator 306 of a headset 300, may be triggered to change the position of the microphone 302 of the headset 300, from the first position to the second position.

Figure 6:
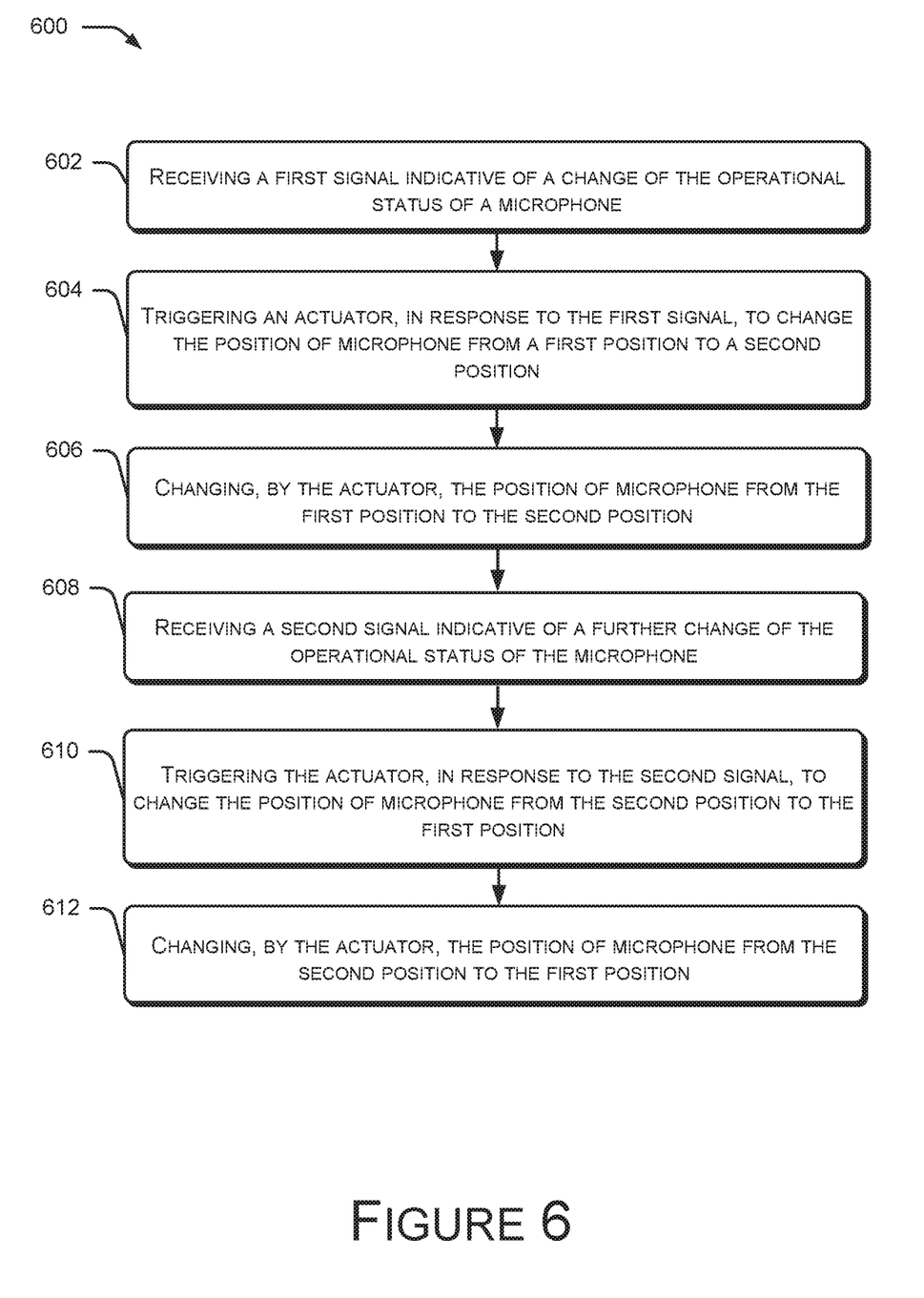
FIG. 6 illustrates a method of changing a position of a microphone of a headset, in accordance with another example implementation of the present subject matter.

FIG. 6 illustrates a method 600 of changing the position of a microphone coupled to a headset, in accordance with an example implementation of the present subject matter. Although the method 600 may be implemented in a variety of computing system, but for the ease of explanation, the description of the exemplary method 600 to change the position of the microphone is provided in reference to the above-described communication environment.

The order in which the method 600 is described is not intended to be construed as a limitation, and any number of the described method blocks may be combined in any order to implement the method 600, or an alternative method.

It may be understood that blocks of the method 600 may be performed by the communication environment 100. The blocks of the method 600 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

At block 602, a first signal indicating a change in operational status of a microphone is received. In an example, the first signal may be received by a communication unit of a headset, such as, the communication unit 304 of the headset 300. The method, thereafter, proceeds to block 604.

At block 604, an actuator is triggered, in response to the first signal, to change the position of the microphone from a first position to a second position. In an example, an actuator 306 of a headset 300, may be triggered to change the position of the microphone 302 of the headset 300, from the first position to the second position. The method, thereafter, proceeds to block 606.

At block 606, the actuator changes the position of the microphone from the first position to the second position. The method, thereafter, proceeds to block 608.

At block 608, a second signal indicative of a further change of the operational status of the microphone is received. In an example, the second signal may be received by a communication unit of a headset, such as, the communication unit 304 of the headset 300. The method, thereafter, proceeds to block 610.

At block 610, the actuator is triggered, in response to the first signal, to change the position of the microphone from the second position to the first position. In an example, the actuator 306 of the headset 300, may be triggered to change the position of the microphone 302 of the headset 300, from the second position to the first position. The method, thereafter, proceeds to block 612.

Finally, at block 612, the actuator again changes the position of the microphone from the first position to the second position.

Although examples for the present disclosure have been described in language specific to structural features and/or methods, it would be understood that the appended claims are not necessarily limited to the specific features or methods described. Rather, the specific features and methods are disclosed and explained as examples of the present disclosure.

We claim:

1. A method to control a position of a microphone of a headset, the method comprising:
   receiving a first signal from a computing device, wherein the first signal is indicative of change of operational status of the microphone coupled to the computing device; and
   triggering an actuator, in response to the first signal, to change the position of the microphone from a first position to a second position.

2. The method as claimed in claim 1, wherein the first signal is indicative of change of operational status of the microphone from one of unmute to mute or from mute to unmute.

3. The method a claimed in claim 2, wherein the position of the microphone is changed from an extended position to a retracted position, and wherein the first signal is indicative of change of operational status of the microphone from unmute to mute.

4. The method a claimed in claim 2, wherein the position of the microphone is changed from a retracted position to an extended position, and wherein the first signal is indicative of change of operational status of the microphone from mute to unmute.

5. The method as claimed in claim 1, wherein the first position is one of a retracted position and an extended position.

6. The method as claimed in claim 1 further comprising:
   receiving a second signal from the computing device, wherein the second signal is indicative of further change of the operational status of the microphone;
   triggering the actuator, in response to the second signal, to change the position of the microphone from the second position to the first position.

7. A computing device to control a position of a microphone of a headset, the computing device comprising:
   a user interaction unit to receive an input from a user to change operational status of the microphone coupled to the computing device; and
   a communication unit to send a first signal to the headset coupled to the computing device to change the position of the microphone from a first position to a second position.

8. The computing device as claimed in claim 7, wherein the input from the user is to change the operational status of the microphone from unmute to mute, and wherein the position of the microphone is changed from an extended position to a retracted position.

9. The computing device as claimed in claim 7, wherein the input from the user is to change the operational status of the microphone from mute to unmute, and wherein the position of the microphone is changed from a retracted position to an extended position.

10. The computing device as claimed in claim 7 comprising:
    the user interaction unit to receive another input from the user to change the operational status of the microphone; and
    the communication unit to send a second signal to the headset to change the position of the microphone from the second position to the first position.

11. A headset comprising:
    a microphone;
    a communication unit to receive a first signal, wherein the first signal is indicative of change in operation status of the microphone; and
    an actuator coupled to the microphone to change position of the microphone between a first position and a second position, in response to the first signal.

12. The headset as claimed in claim 11, wherein the actuator is to change the position of the microphone from the first position to the second position when the first signal is indicative of change in operational status of the microphone from unmute to mute.

13. The headset as claimed in claim 11, wherein the actuator changes the position of the microphone from the second position to the first position when the first signal is indicative of change in operational status of the microphone from mute to unmute.

14. The headset as claimed in claim 11, wherein the first position is an extended position and the second position is a retracted position.

15. The headset as claimed in claim 14, wherein the first position is closer to mouth of a user that the second position, the second position being away from the mouth of the user.

* * * * *